(12) United States Patent
Salenc et al.

(10) Patent No.: US 6,499,699 B1
(45) Date of Patent: Dec. 31, 2002

(54) SATELLITE ATTITUDE CONTROL SYSTEM AND METHOD

(75) Inventors: Cédric Salenc, Cannes (FR); Xavier Roser, Cannes (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/607,956

(22) Filed: Jun. 30, 2000

(30) Foreign Application Priority Data

Jul. 8, 1999 (FR) .............................................. 99 08841

(51) Int. Cl.$^7$ ................................................ B64G 1/26
(52) U.S. Cl. ........................ 244/165; 244/169; 244/170; 244/171
(58) Field of Search ................................ 244/164, 165, 244/169, 170, 171; 700/13

(56) References Cited

U.S. PATENT DOCUMENTS

| | | | | |
|---|---|---|---|---|
| 3,452,948 A | * | 7/1969 | Kukel et al. | 244/165 |
| 5,826,829 A | * | 10/1998 | Holmes | 244/165 |
| 6,076,772 A | * | 6/2000 | Eyerly et al. | 244/165 |
| 6,089,508 A | * | 7/2000 | Noyola et al. | 244/165 |
| 6,113,033 A | * | 9/2000 | Parks et al. | 244/165 |
| 6,135,392 A | * | 10/2000 | Wakugawa | 244/164 |
| 6,241,194 B1 | * | 6/2001 | Heiberg | 244/165 |

FOREIGN PATENT DOCUMENTS

EP  0 568 209 A1  11/1993

OTHER PUBLICATIONS

US2001/0007340 A1, Dargent et al Jul. 12, 2001.*
N.L. Wertz, "Spacecraft Attitude Determination and Control", 1978, NL, Dordrecht, Kluwer, pp. 200–203, XP002130913.
Hari B. Hablani, "Sun–tracking Commands and Reaction Wheel Sizing with Configuration Optimization", Journal of Guidance and Control and Dynamics, US, AIAA, New York, vol. 17, No. 4, Jul. 1, 1994 pp. 805–814 XP000494550.

* cited by examiner

*Primary Examiner*—Galen L. Barefoot
(74) *Attorney, Agent, or Firm*—Sughrue Mion, PLLC

(57) ABSTRACT

A satellite attitude control system includes a programmed processor system which includes a gyroscopic actuator first control stage for changing the attitude of the satellite and a reaction wheel second control stage for assuring that pointing of the satellite is accurate and stable. The method is intended to be used for a satellite including the two control stages indicated above, which it uses selectively for the operations indicated above.

5 Claims, 3 Drawing Sheets

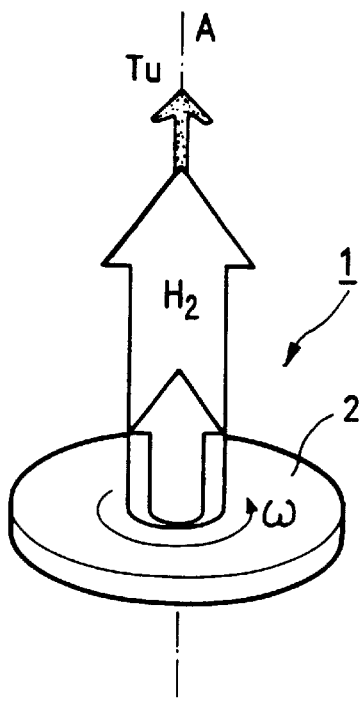
FIG_1
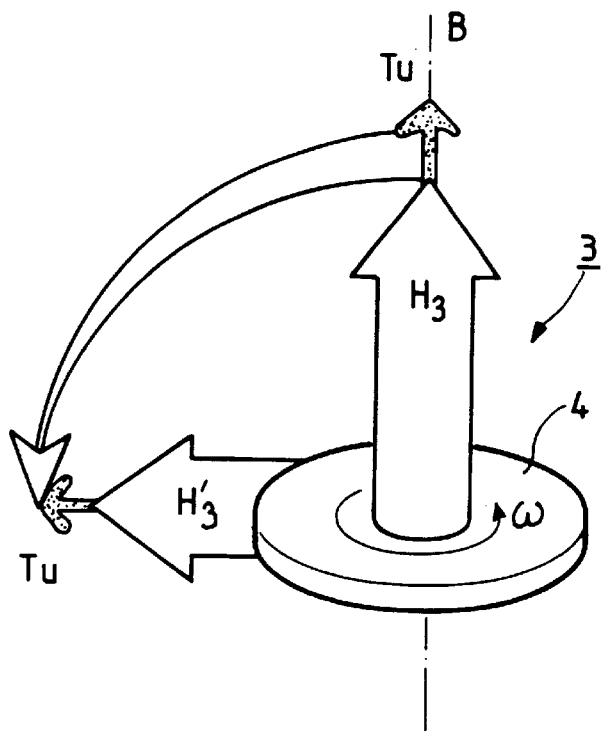
FIG_2
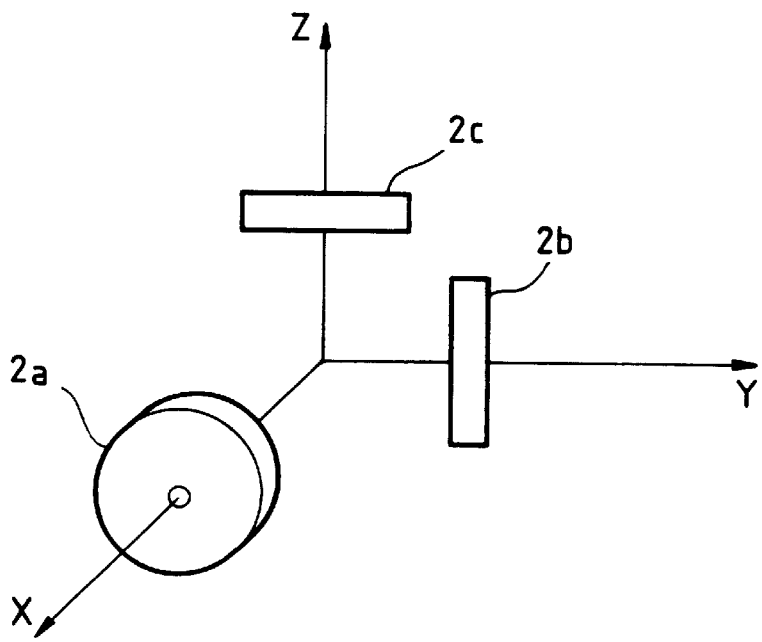
FIG_6

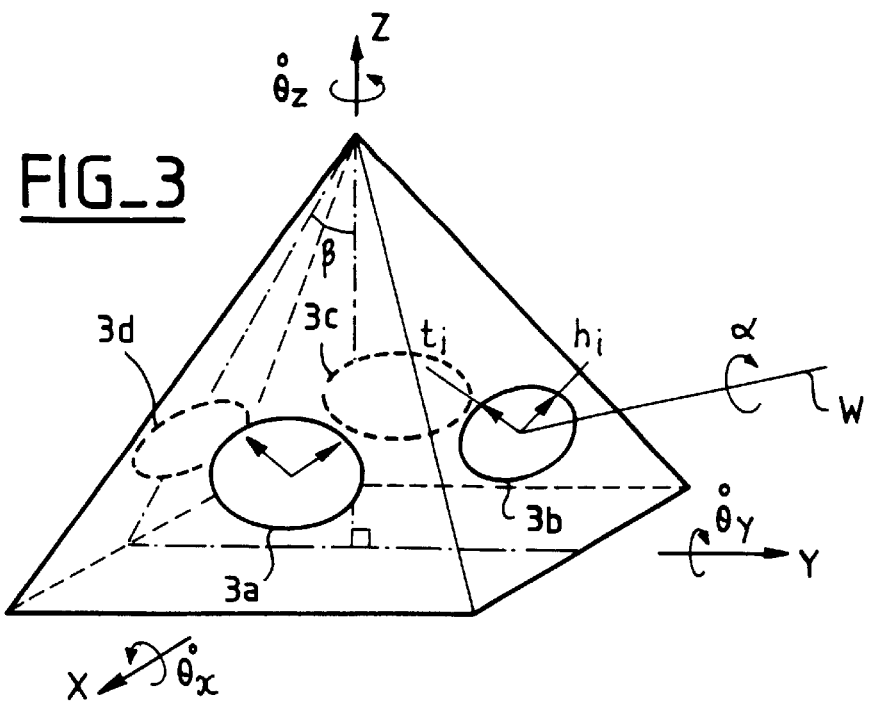
FIG_3
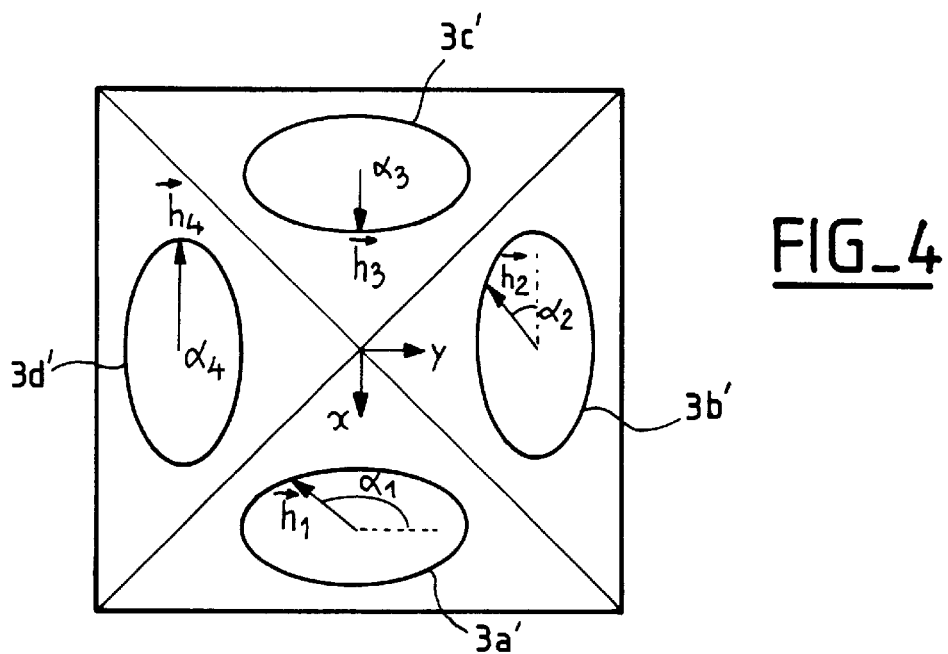
FIG_4
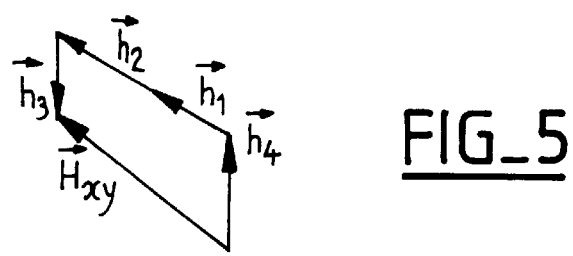
FIG_5

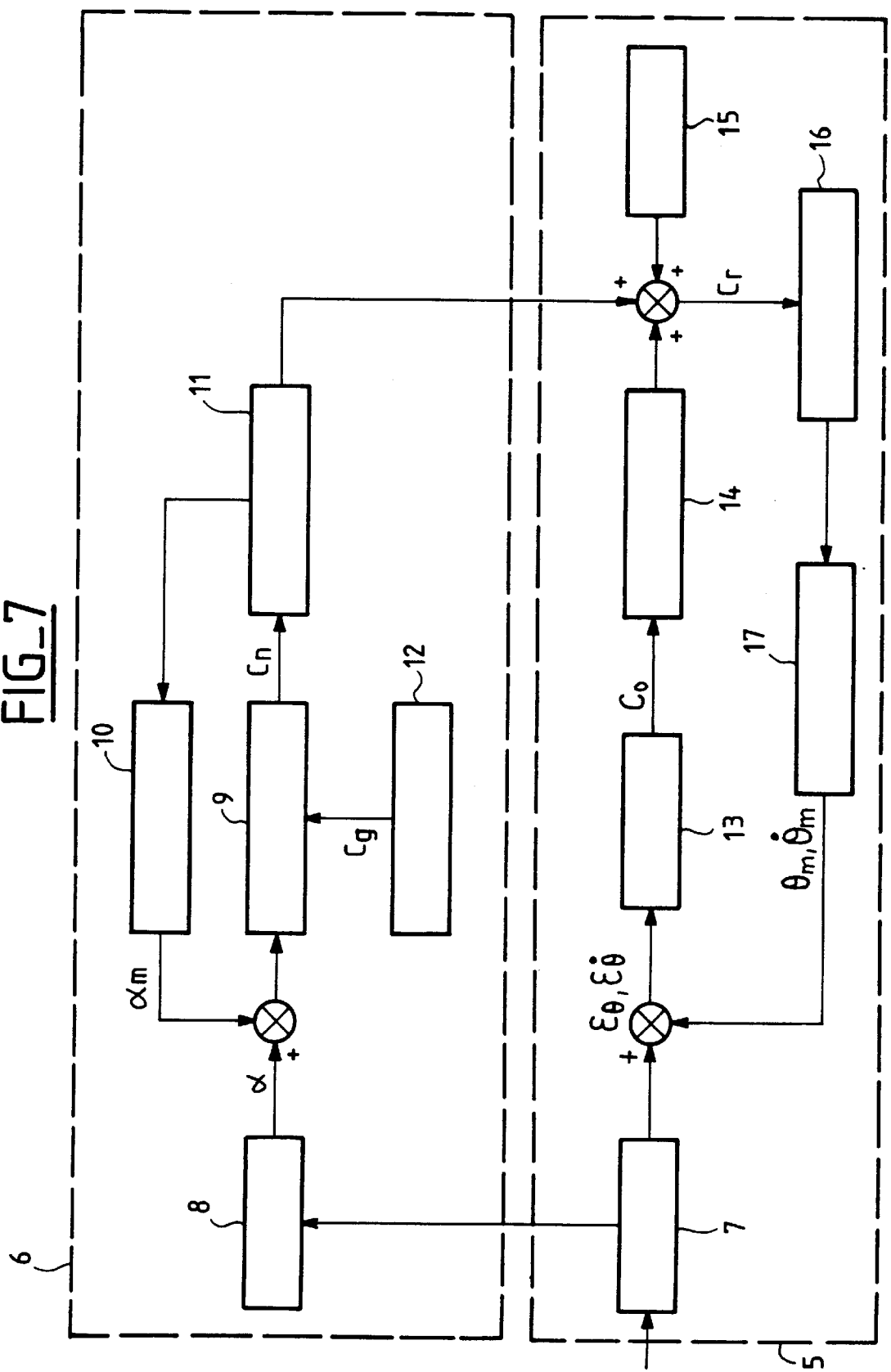

SATELLITE ATTITUDE CONTROL SYSTEM AND METHOD

The invention relates to a system for controlling the attitude of a satellite in orbit, which system is more particularly intended to be used when great agility is required of the satellite. It also relates to a satellite control method employing the system.

BACKGROUND OF THE INVENTION

Operating a satellite in orbit in space requires the satellite to be equipped with a system for controlling its attitude so that it can be oriented in a particular manner and stabilized when it is correctly oriented.

In some forms of operation which require great agility of the satellite, for example a remote sensing satellite, it is important for the attitude control system to be able to change the orientation of the satellite quickly and to stabilize the satellite quickly after such changes.

A satellite can be oriented and stabilized with relatively low expenditure of energy by an attitude control system entailing the satellite reacting to a moving mechanism within the satellite. This is known in the art. The energy employed can be renewable energy.

One example of a control system of the above kind is described in U.S. Pat. No 3,452,848. The system described uses gyroscopic actuators each including a motorized rotor which is used to create angular momentum of constant amplitude and a gimbal system for modifying the orientation of the rotor and consequently its angular momentum. Angular momentum can be exchanged very quickly between a gyroscopic actuator and the satellite carrying it. This is known in the art. However, actuators of this kind are somewhat inaccurate unless the specification is very severe, in particular with regard to the motors. The ratio between the accuracy of the output torque of a gyroscopic actuator and that of its gimbal motor is a function of the angular momentum. Also, a gyroscopic actuator generates a rotating torque, although a fixed torque would be preferable. The guidance law for a satellite equipped with a control system using gyroscopic actuators is therefore generally relatively complex and leaves room for singularities which correspond to situations in which the system is incapable of supplying a torque in a given direction, which can lead to loss of control over the satellite. However, despite those drawbacks, gyroscopic actuators of the above kind are used because they have a high torque capacity, enabling a satellite equipped with them to be rotated quickly, at the cost of a particularly severe specification and uprating of their control system, and even though they are consequently of high cost. This is known in the art.

Reaction wheels have the advantage of being mechanically less complex than gyroscopic actuators but the disadvantage of producing only a relatively low torque, compared to that which can be produced by a gyroscopic actuator. This is also known in the art. A reaction wheel can produce a torque of the order of 1 Nm, for example, compared to a torque of several thousand Nm for a gyroscopic actuator.

OBJECTS AND SUMMARY OF THE INVENTION

The invention therefore proposes a satellite attitude control system.

According to a feature of the invention, the system includes a programmed processor system which includes a gyroscopic actuator first control stage for changing the attitude of the satellite and a reaction wheel second control stage for assuring that pointing of the satellite is accurate and stable.

The invention also proposes an attitude control method for a satellite equipped with a gyroscopic actuator first control stage and a reaction wheel second control stage.

According to a feature of the invention, the method uses the actuator first stage to perform changes of attitude of the satellite on command, and it uses the reaction wheel second stage to point and stabilize the satellite.

According to the invention, the method also uses the reaction wheel second stage to accumulate unwanted torques which affect the satellite.

BRIEF DESCRIPTION OF THE DRAWINGS

The invention, its features, and its advantages are explained in the following description, which is given with reference to the figures listed below.

FIGS. 1 and 2 are respectively diagrammatic representations of a reaction wheel and of a gyroscopic actuator.

FIG. 3 is a theoretical diagram of an example of a gyroscopic actuator stage for a system in accordance with the invention for controlling the attitude of a satellite in orbit.

FIG. 4 is a diagram showing an example of the distribution of the angular momentum created by a gyroscopic actuator stage as shown in FIG. 3 when projected into a plane.

FIG. 5 is a vector diagram representing the angular momentum created by a gyroscopic actuator stage when projected into a plane, as shown in FIG. 3, and corresponding to the distribution shown in FIG. 4.

FIG. 6 is a theoretical diagram of one example of a reaction wheel stage for a system according to the invention for controlling the attitude of a satellite in orbit.

FIG. 7 is a theoretical diagram of an example of an attitude control system according to the invention.

MORE DETAILED DESCRIPTION

FIG. 1 is a diagrammatic representation of a prior art reaction wheel which includes a disk 2 driven in rotation about an axis A of fixed orientation. The disk has a angular momentum H which increases with the rotation speed ω imparted to it by a variable speed motor, not shown. Two different values $H_1$ and $H_2$ of the angular momentum are symbolized in the figure.

The wanted torque Tu produced by the disk 2 is an axial torque which increases with speed and which tends to cause the structure on which the wheel 1 is mounted, which is that of a satellite in the intended application, to be turned by reaction forces.

The mass of a reaction wheel disk on board a satellite must generally be low, for reasons known to the skilled person, and consequently the torque obtained and the maximum exchange of angular momentum are generally not particularly high. In contrast, the mechanism supporting and driving the wheel can easily be made simple and rugged and the speed of the wheel can be controlled, by operating on the motor driving it, using efficient and reliable techniques that are well understood in the art.

FIG. 2 is a diagrammatic representation of a prior art gyroscopic actuator 3 which includes a disk 4 driven in rotation about an axis YY' whose orientation in a fixed plane can be modified intentionally because the disk 4 is mounted in a simple controlled gimbal mechanism, not shown. The disk 4 rotates at constant speed and produces an angular momentum $H_3$ which has a particular constant absolute value. There is a high transfer of energy between the disk 4 and the structure on which the gyroscopic actuator is mounted if the orientation of the axis B, and therefore that of the angular momentum $H_3$, is modified by causing the gimbal mechanism to rotate the axis B in a plane. Two orientations $H_3$ and $H'_3$ of the angular momentum of the disk 4 are shown here, the second orientation being obtained by rotating the axis B through a right angle in the plane of the figure.

The torque and the maximum exchange of angular momentum between the disk 4 and the structure are much higher than in the case of a reaction wheel, as is known in the art, and a moving structure, and in particular a satellite in orbit, can therefore be rotated at high speed by reaction forces.

The mechanical construction of a gyroscopic actuator is more of a problem than that of a reaction wheel because the gimbal requires rugged mechanical and electrical connecting systems. Moreover, in satellite attitude control systems in which the position of the satellite in orbit is controlled entirely by a group of gyroscopic actuators, the actuators must be able to supply high torques to make the satellite equipped with them highly agile and at the same time to position it in a particular attitude in a precise and stable manner. This is the case in particular if the satellite must acquire and retain a required sighting line.

The number and the positions of the gyroscopic actuators of a satellite are determined with the objective of enabling it to acquire and maintain a maximum number of different attitudes in orbit and to prevent it acquiring an attitude that cannot be modified.

FIG. 3 is a diagrammatic representation of an example of a prior art gyroscopic actuator group structure which here is used in a gyroscopic actuator control stage for an orbiting satellite attitude control system according to the invention. It is to be understood that this stage could be made up of a different number of gyroscopic actuators and/or with different arrangements of the actuators.

In the prior art structure shown in FIG. 3, four gyroscopic actuators are used to position a satellite equipped with them. The actuators are arranged so that the plane in which the angular momentum H specific to each of them changes is coincident with a plane which defines one of the four lateral faces of a square-based pyramid.

The closed curve 3a, 3b, 3c, 3d which constitutes the envelope in which the angular momentum H of each actuator can move is represented on a corresponding face of the pyramid. An angular momentum $h_i$ and the corresponding output torque $t_i$ at a time i are shown diagrammatically in FIG. 3 for the actuator whose angular momentum curve is the curve 3a.

The combination of the actions of the respective gyroscopic actuators produced on command modifies the attitude in its orbit of the satellite which includes them. Each actuator can rotate the satellite about the articulation axis of its own gimbal, about which the disk 4 of the actuator tilts on command. This rotation axis passes through the center of the angular momentum envelope curve, to whose plane it is perpendicular, such as the reference axis W for the actuator whose envelope curve is the curve 3a. The modification of the angular momentum obtained with an actuator is reflected in a torque which rotates the satellite relative to the axis W at a rotation speed $\dot{\alpha}$. This rotation can be represented as rotations about three axes X, Y, Z of a fixed system of axes with respective speed components $\dot{\theta}_x$, $\dot{\theta}_y$, $\dot{\theta}_z$.

Each of these three components can be considered as obtained by combining components in the reference plane to which the component concerned is perpendicular, such as the plane XY defined by the axes X and Y for the component $\dot{\theta}_z$, and which are due to the rotations simultaneously produced by the four gyroscopic actuators of the satellite at that time.

The projection $\vec{h}_1$, $\vec{h}_2$, $\vec{h}_3$ or $\vec{h}_4$ in the plane XY of the angular momentum $H_1$, $H_2$, $H_3$ or $H_4$ relating to one of the four gyroscopic actuators of the satellite at a given time determines the component $\vec{H}_{xy}$ of the resultant angular momentum of the satellite, as can be seen in FIG. 5. Rotation of the satellite through a given angle by the gyroscopic actuators is therefore reflected in a resultant moment whose components projected into the three planes XY, XZ and YZ must be obtainable by vector addition of the projections of the angular momentum then produced by each of the four actuators. In the example shown in FIGS. 4 and 5, this is obtained in the plane XY by vector addition of the projections $\vec{h}_1$, $\vec{h}_2$, $\vec{h}_3$, and $\vec{h}_4$ whose amplitudes and respective angles $\alpha_1$, $\alpha_2$, $\alpha_3$, and $\alpha_4$ are shown.

According to the invention, the action of the gyroscopic actuators 3 of the satellite is more particularly oriented towards changing the attitude of the satellite on command and a control stage using reaction wheels 2 is associated with the stage in the satellite formed by the gyroscopic actuators 3 for accurate pointing and stabilization of the satellite.

It is therefore possible to use gyroscopic actuators, whose specifications are significantly less severe than those of prior art actuators since, as they are essentially used to achieve agility of the satellite, they do not need to be very accurate, as accurate positioning of the satellite is handled by the reaction wheel stage. It is therefore possible to design them with emphasis on ruggedness and simplicity. Moreover, combining a gyroscopic actuator stage and a reaction wheel stage in the same attitude control system eliminates the risk of singularity, which can lead to loss of control of the satellite, and which is a feature of control systems using gyroscopic actuators only. It is therefore possible to take maximum advantage of the angular momentum potential of the gyroscopic actuator stage. Because the reaction wheels are used for accuracy and to accumulate the angular momentum due to unwanted torques, control of the gyroscopic actuators can be rugged and conform to simple avoidance laws (indirect law, reconfiguration to preferred angles, etc.), since the gyroscopic actuator system continues to have zero angular momentum, implying full control of the configuration of the control system. It therefore avoids uprating of the actuators, which minimizes the cost of the hardware and reduces the technical complexity of the system. Thus the rotary contacts of the gimbal bearing can be replaced by a flexible braided conductor and the combination of a DC motor and an optical encoder can be replaced by a simple stepper motor.

One non-limiting example of a reaction wheel stage is shown diagrammatically in FIG. 6. The arrangement is known in the art but is utilized here in the context of the invention.

The stage shown is made up of three reaction wheels 2a, 2b, 2c with respective rotation axes in corresponding angular relationship to the three axes X, Y, Z of the fixed system of axes referred to above. The angular momentum of each wheel can be modified accurately by altering the speed of the motor driving the rotation of the wheel. The combination of the reaction wheels of the stage enables a low torque to be obtained which can be finely modulated and easily used on the satellite for accurate termination of pointing or for attitude correction in the stabilization phase.

To this end, the attitude control system according to the invention includes a processor system programmed to control the two control stages. The processor system can be supervised from the ground. It operates in accordance with a program which is stored in an onboard storage unit and/or transmitted from the ground and which determines a profile to be complied with. A theoretical diagram of one such processor system is shown by way of non-limiting example in FIG. 7.

The processor system includes two subsystems 5 and 6 respectively concerned with the gyroscopic actuators and with the reaction wheels.

It uses a maneuvering profile for the satellite in orbit whose data is stored in a unit 7. For example, the data is prestored or stored after transmission from the ground, as already mentioned.

When a change of attitude is required for a given maneuvering profile, the gyroscopic actuator subsystem 5 receives from the unit 7 an angular position set point α, also referred to as the gimbal set point (see FIG. 7). Here this set point defines the angle of inclination to be imparted mechanically to each gimbal and therefore corresponds to the choice of a particular angle for the angular momentum appropriate to each actuator to a reference position of the gimbal which is determined mechanically. A set point is usually retained until the next set point that gives the chosen profile is sent. In the case of a DC motor, the angle data α is processed by an attitude corrector 9 in conjunction with measured angle data $α_m$ supplied by a sensor 10 connected to the control stage 11 made up of the gyroscopic actuators 3 and an estimate $C_g$ of the gyroscopic torque produced by a unit 12. The corrector supplies a motor torque set point $C_M$ based on angle data which is obtained by adding the data α and $α_m$ and the estimate $C_g$. That set point is reflected in a specific inclination command for the gimbal of each of the gyroscopic actuators of the stage 11. It is used by the motor which changes the orientation of the gimbal in each actuator 3. In the case of a stepper motor, the position set point is input directly to the motor, which imparts the required orientation to the gimbal. This is an open loop system and does not require a sensor.

The torque produced by the gyroscopic actuator stage is taken into account by the subsystem 5 for the reaction wheels 2, which considers it as one of the kinds of unwanted torque that this subsystem has to manage. It considers as unwanted various phenomena, in particular those of external origin, likely to cause unwanted changes to the attitude to the satellite in orbit, i.e. changes other than those imposed by the subsystem 5. A modification is made if the satellite includes a remote external structural member, for example a solar panel, which tends to cause unwanted rotation of the satellite because of drag.

The subsystem 5 is also connected to the unit 7 from which it can receive specific data according to the profile then chosen for the satellite. In the example shown, the unit 7 is included in the subsystem 5, in which it is connected to an attitude corrector 13. This operates on the stage 14 of the satellite comprising the reaction wheels 2, which can therefore modify the attitude of the satellite dynamically. The attitude and the speed are functions of the torques applied to the satellite by the reaction wheels and the gyroscopic actuators and the unwanted torques 15 which operate dynamically on the satellite. The corresponding resulting torque $C_r$ applied to the satellite (symbolized by the block 16 in the diagram) causes the satellite to rotate. The attitude θ and the speed θ̇ of the satellite are determined by a set of sensors 17. The measured attitude $θ_m$ and the measured rotation speed $θ̇_m$ of the satellite provided by the sensor system 17 are added to the data supplied by the unit 7 to constitute set points for correcting the angular position error εθ and the rotation speed εθ̇ which are used by the attitude corrector 13 to supply a torque set point $C_c$ to the reaction wheel stage 14 of the satellite. This set point is reflected in a specific speed set point for the drive motor, not shown, of each reaction wheel. These drive motors produce the required torque by accelerating, decelerating or possibly maintaining the same speed, depending on the torque value then imposed.

The torque that can be produced by the reaction wheel stage has practically no effect during a change of attitude by the gyroscopic actuators because a non-zero torque is produced by the stage formed by those actuators. The reaction wheels operate in a closed loop, track the profile and correct satellite position and rotation speed errors, due in particular to the relative inaccuracy of the torque provided by the gyroscopic actuator stage injected into a feedforward loop.

What is claimed is:

1. A satellite attitude control system, including a programmed processor system which includes a gyroscopic actuator first control stage for changing the attitude of the satellite and a reaction wheel second control stage for assuring that pointing of the satellite is accurate and stable.

2. A system according to claim 1, wherein the first control stage includes four gyroscopic actuators in a pyramidal configuration.

3. A system according to claim 1, wherein the second control stage includes at least three reaction wheels whose rotation axes have different orientations.

4. An attitude control method for a satellite equipped with a gyroscopic actuator first control stage and a reaction wheel second control stage, wherein the method uses the actuator first stage to perform changes of attitude of the satellite on command and the reaction wheel second stage to point and stabilize the satellite.

5. A method according to claim 4, which uses the reaction wheel second stage to accumulate unwanted torques which affect the satellite.

* * * * *